United States Patent Office 3,270,769
Patented Sept. 6, 1966

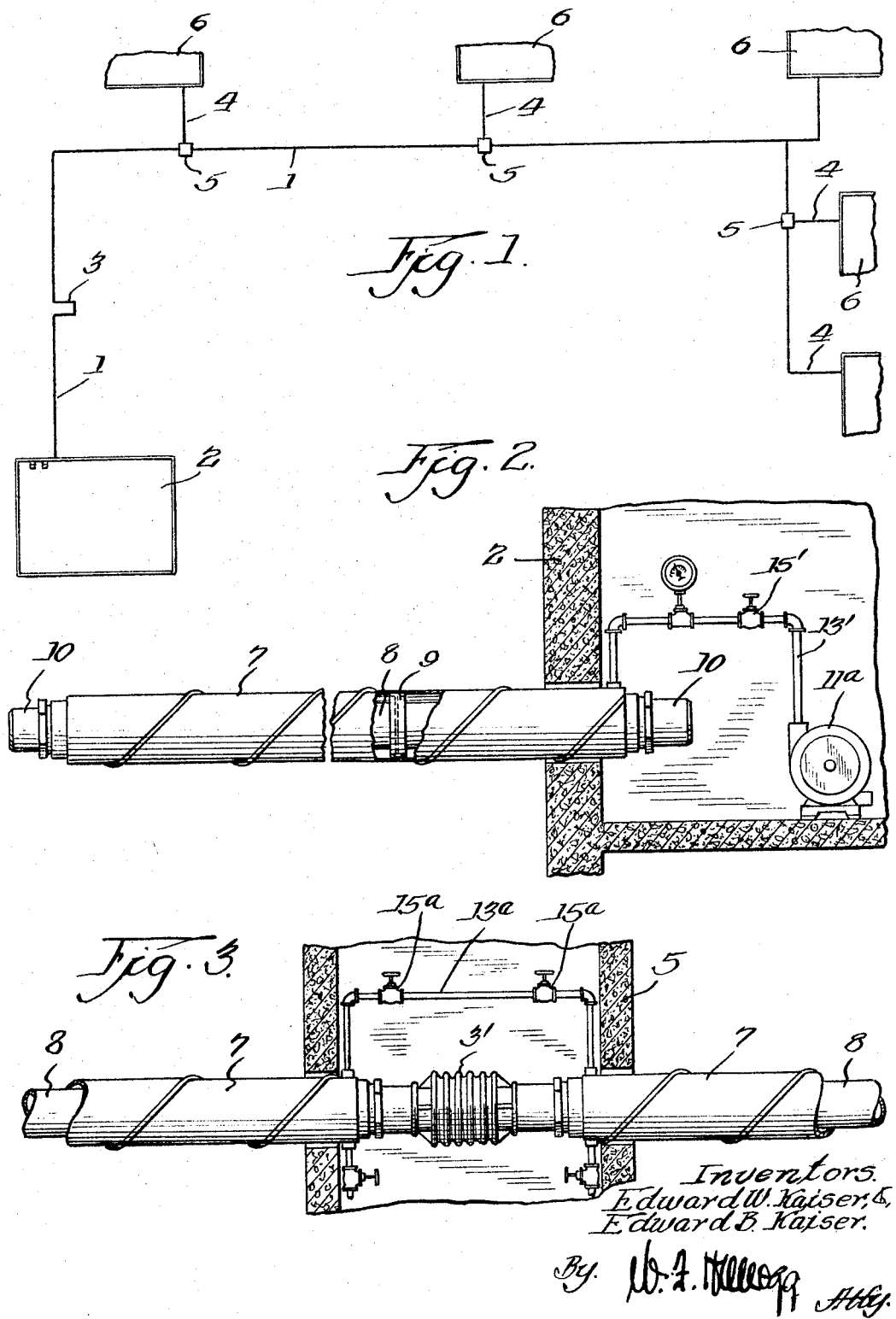

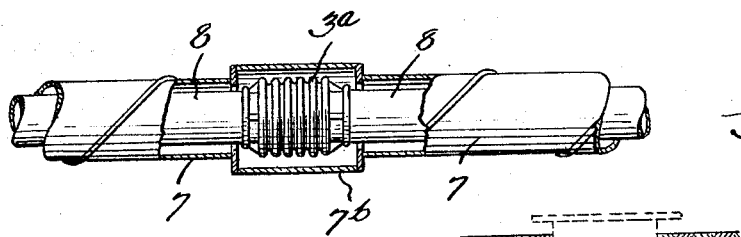
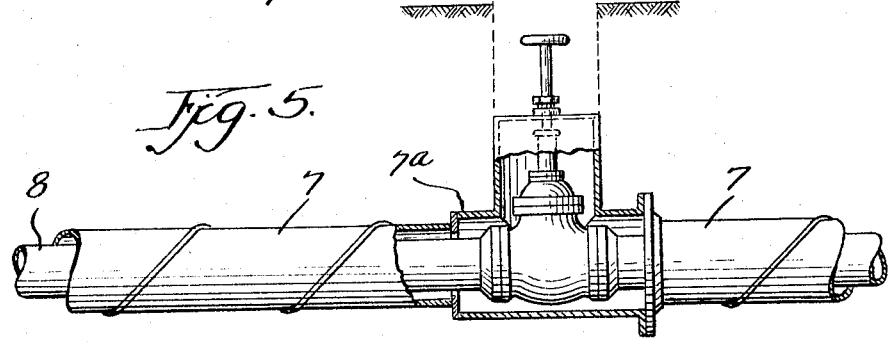
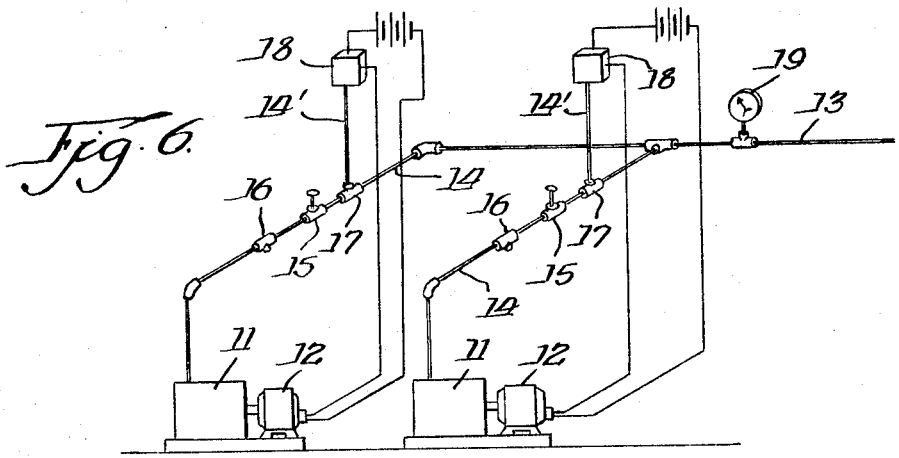
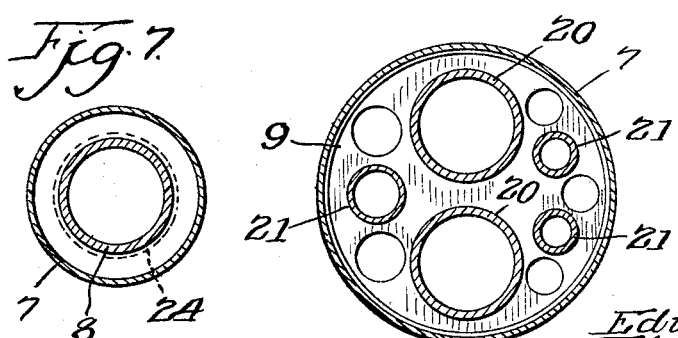
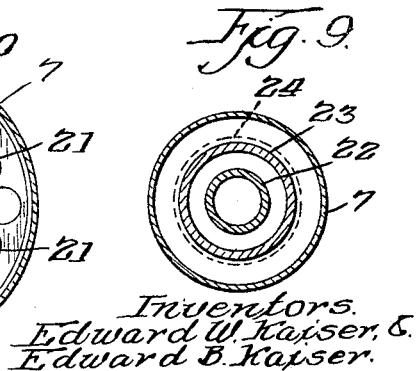

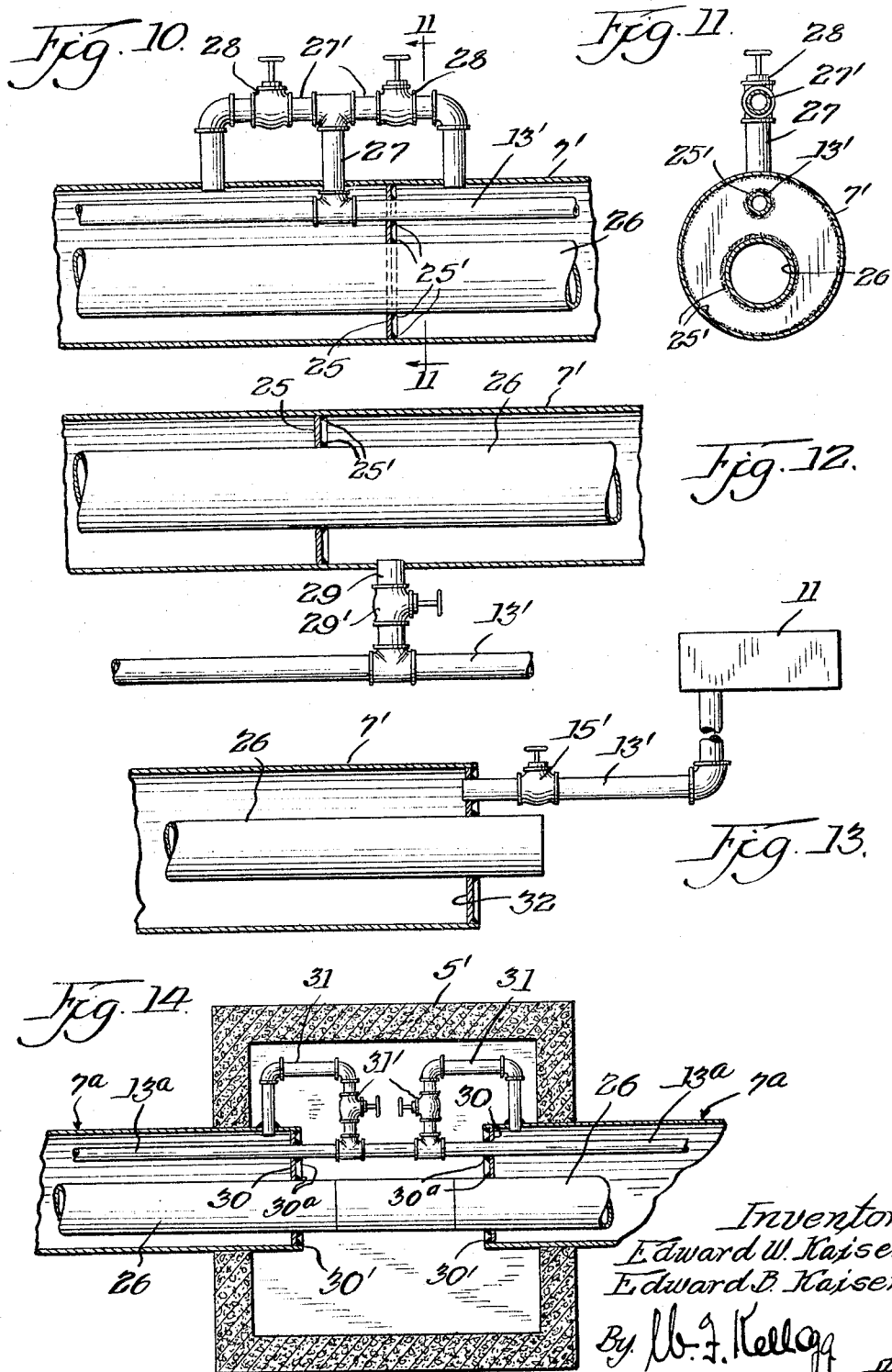

3,270,769
VACUUM INSULATING SYSTEM FOR JACKETED PIPING SYSTEMS
Edward W. Kaiser and Edward B. Kaiser, both of 2114 West Lake Ave., Glenview, Ill.
Filed Mar. 30, 1965, Ser. No. 443,960
4 Claims. (Cl. 137—375)

This invention relates to improvements in jacketed pipe or piping systems, especially to piping systems of that character as described and claimed in the United States Letters Patent Nos. 2,570,446, 2,658,527 and 2,680,901, and in the copending application Serial No. 379,990, filed July 2, 1964, issued to and made by Edward W. Kaiser.

An object of the invention resides in providing to the encased or housed fluid conveying pipes of a jacketed piping system a novel and effective insulation and system of insulation by means of which the temperatures of fluids (flowable matters) confined therein and flowing therethrough, whether hot or cold, will be maintained at the desired and/or required degrees, this without the use of insulation of corporeal or physical characters, such as asbestos, fiber glass, combinations thereof, etc.

More particularly, it is an object of the invention to provide to jacketed pipe or piping installations or systems a vacuum (partial vacuum) form of insulation, and to implement it with means for initially effecting and maintaining the same to and at the desired or required degree.

It is also an object of the invention to provide a jacketed piping system and insulating means therefor which can be economically installed and maintained in operative being with but a minimum of attendance; furthermore, one which will operatively and efficiently maintain over long periods of time, regardless of the kind or plate of installation of a provided system, and the external conditions to which it may be subjected, and will successfully withstand impact, shock and/or vibration of normal or abnormal characters.

Another object of the invention is to provide an insulation means which can be advantageously installed and efficiently and operatively maintained in submarine, subterranean, ground surface and/or overhead jacketed piping systems, this with only slight modification of and costs less than those required for the installation of corporeal or physical insulation materials.

A further and important object of the invention is to provide a system of vacuum insulation for and to jacketed piping systems including, in addition to singly housed pipes, plural fluid confining and transporting pipes within a single housing casing therefor, whereby said pipes and the fluids confined therein and flowing therethrough will be positively maintained at the required temperature, regardless of the differences therebetween or kinds thereof.

Yet another object of our invention is to provide a jacketed piping system in which the housed pipes and their jackets or casings are "block" sectionalized, i.e., one or more lengths or "runs" or "blocks" thereof may be selectively disconnected from the air evacuating pumps which are connected to and communicate with the flow ways between and about the housed pipes and their jackets or casings, for exhausting air and/or fluid therefrom in the event of difficulty or difficulties which may occur therein, as by leakage, rupture, clogging, etc., this without interrupting or disturbing evacuating connection or communication with the flow ways of the remaining "runs" or "blocks" of piping, and with correction of such difficulty, reconnected for re-inclusion in the system and the evacuation of their respective flow ways.

The foregoing, as well as other objects, advantages, and meritorious teachings of our invention, will be in part obvious and in part pointed out in the following detailed disclosure thereof, when taken in conjunction with the accompanying drawings, it being understood that the forms of the invention presented herein are precise and what are now considered to be the best modes of embodying its principles, but that other or further modifications and changes may be made in specific embodiments without departing from its essential features.

In the drawings:

FIGURE 1 is a diagrammatic view of one type of jacketed piping fluid transporting system utilizing our invention;

FIGURE 2 is a fragmentary detail, partly in section, showing a vacuum pump located in a portion of a boiler or control house plus a fragmented section of jacketed pipe entered thereinto, with the pump connected to and communicating with the jacket-pipe fluid flow-way.

FIGURE 3 is a view like FIGURE 2, showing adjacent and opposed ends of the jackets or casings of a jacketed pipe line entered into a manhole, with the inner transporting pipe passing therethrough and having a conventional type of bellows expansion joint interposed therein; the manhole entered ends of the jackets being closed by seals, and the flow ways of each intercommunicating by the connection of a jumper pipe thereto.

FIGURE 4 is a fragmental detail, partly in section, of a length of jacketed pipe wherein a bellows expansion joint is provided to the pipe and encased by the jacket whereby to render the evacuable flow way continuous.

FIGURE 5 is a view like FIGURE 4, in which an inner pipe flow control valve is encased, with its vertical handle encased or housed and accessible, the jacketed piping being underground.

FIGURE 6 is a semi-schematic showing of the vacuum creating means (pumps) and their respective connections to and with the suction or vacuum pipe, plus the pressure actuated switches for automatically effecting energization and/or deenergization of the vacuum pump electric motors.

FIGURE 7 is a transverse section through a section of the jacketed piping showing the spaced relationing between the inner pipe and its jacket or casing, forming the aforesaid flow way; also illustrating, in dotted lines, the usage of a physical insulation sleeve enveloping said inner pipe as a possible modification or augmentation of the vacuum insulation.

FIGURE 8 is a view similar to FIGURE 7, but wherein a plurality of inner pipes are received and supported in spaced relation within the casing or jacket.

FIGURE 9 is a like view illustrating another modified form in which a plurality of inner pipes are arranged and supported one within another in spaced and coaxial relation within the casing or jacket.

FIGURE 10 is a longitudinal section through a portion of a piping jacket or casing and an inner pipe, wherein sections of the casing are divided into separate and relatively closed or isolated lengths by the placement therein of an anchor plate seal fixedly connected to adjacent portions of the casing and the inner pipe, and the vacuum pipe is housed within the casing and provided with a multiple branch outlet having oppositely disposed individually valved extensions which individually communicate with the casing interiors or flow ways, thus establishing communication between the vacuum pipe and flow ways.

FIGURE 11 is a transverse section taken on the line 11—11 of FIGURE 10 looking in the direction in which the arrows point.

FIGURE 12 is a view similar to FIGURE 10, but in which the vacuum pipe is arranged exteriorly of the jacket or casing and communicates with its interior, or flow way, via a valved branch pipe.

FIGURE 13 is a like view showing the connection of the vacuum pipe and vacuum pump with one end of a jacketed pipeline outwardly of the inner pipe; and FIGURE 14, like FIGURE 3, is a view showing adjacent and opposed closed ends of pipe jackets or casings, entered into a manhole, with the inner transporting pipe passing therethrough and a vacuum pipe in and longitudinally of the jackets and communicable with their respective interiors by means of valved branch pipes extended therefrom and discharging into said jackets.

Referring in detail to the drawings, particularly to the FIGURES 1 through 6, our improved system of vacuum insulation for jacketed piping systems is capable of and advantageous for adaptation in or for the type of system illustrated by FIGURE 1, which includes jacketed piping of the kind described and claimed in the aforesaid United States Letters Patent Numbered 2,658,527 (a jacketed system) and 2,680,901 (a method of assembling jacketed conduit systems) generally comprising, in combination, lengths of fluid-tight interconnected jackets or casings and pipes housed and supported therein in spaced relation to provide overall and continuous flow ways therebetween. The main line or trunk "run" 1 thereof begins at a source of supply or boiler, etc., house 2 and proceeds under or above ground surface over a to-be served area. Expansion loops, such as indicated at 3, are interposed in the "run" at appropriate intervals. Communicating and similarly constructed branch jacketed lines 4 are extended from the main line, as at 5, to—and deliver to—receiving areas or stations 6.

The lines 1 and 4 consist of appropriate lengths of endwise interconnected jacket or casing sections 7 and receiving one or more endwise interconnected pipes 8 therein slidably supported on appropriately ported guide supports 9, as shown in FIGURE 2, in annularly spaced relation, thus providing flow ways continuously therealong and thereabout. The starting or source of supply entry end of the jacketed main line, as illustrated, is preferably closed by a gland or plate seal 10, as may its terminal end, while the inner pipe or pipes is or are connected to and communicate with the supply of flowable matter to be transported thereby.

From the foregoing it will be seen that flowable matter (fluid or liquid or semi-liquid) will be transported via the inner pipe or pipes 8 from the source of supply to the point or points of delivery; that said pipe or pipes 8, being housed in and by the casing 7, will be effectively protected and that a flow way as between the pipes and the casings will be effected throughout the entire length of the thus installed system.

To retain the pipe transported matter or matters at the required temperature (hot or cold) during such transportation, it has heretofore been the practice to encase or cover the transporting pipe or pipes within the casings with various kinds of physical insulating material, as for example, asbestos, fiber glass, combinations of asbestos and fiber glass, etc. The costs of such insulations are material. Moreover, their insulating effectiveness and/or efficiency vary widely, as does their resistance to usage and deterioration, even for relatively brief periods of time.

To eliminate these deficiencies and difficulties, also to advantageously reduce those costs incident to their installation and use, our invention includes the effecting and maintenance of a vacuum (partial vacuum) in the flow way or flow ways about and along the matter transporting inner pipe or pipes of jacketed piping, and those instrumentalities employed for such accomplishment.

As shown in FIGURE 6 of the drawing, appropriate types of vacuum pumps 11 are employed for evacuating the aforesaid flow ways, being driven by electric motors 12.

To effect and maintain a partial vacuum of required and satisfactory degree in the flow way or flow ways of an insulated jacketed piping system, such as described and claimed in the hereinbefore identified Letters Patent and pending patent application, an air exhausting pipe line 13, hereinafter more fully described, is provided and is communicatively connected to the same. Branch pipes 14 are extended from the air exhausting or vacuum pipe line and connected to the intake ports of said pumps 11, preferably, but not necessarily located in the boiler or supply house 2. Hand actuatable and check valves 15 and 16, respectively, are interposed in said branch pipes with the hand actuatable ones nearer the air exhausting pipe line 13. Also, branch outlet couplings 17 are interposed in and connected to secondary branch pipes 14' communicating with suitable and well-known types of pressure actuated electric switches 18 which, in turn, are included in electrical circuits supplying energy to the motors 12.

To indicate the degree of pressure or partial vacuum in the vacuum line 13, a gauge 19 is interposed therein.

In some or certain instances of installation of our jacketed pipe vacuum insulating system, it may be desired to effect direct connection of one or more vacuum pumps with an equipped system. Therein, as shown in FIGURE 2 of the drawings, an air exhausting pipe 13' is connected to the intake port of a vacuum pump 11ª located in the supply or boiler house 2 or other suitable housing, having a hand actuatable control valve 15' and a pressure gauge 19' interposed therein for obvious purposes.

A jacketed piping system equipped or provided with our vacuum insulation system may or will be of such length as to warrant its being "block" sectionalized, as shown in FIGURE 1 of the drawings and hereinbefore set forth. However, it will be understood that single or lesser lengths of jacketed piping provided with our invention, including the automatic means for controlling and maintaining the degree of vacuum in the flow way or flow ways thereof, may be installed and used with equally satisfactory results.

In underground installations of the vacuum pipe insulated jacketed piping system wherein "runs" or sections thereof are entered into manholes 5 (see FIGURE 3), to maintain a continuous and uninterrupted evacuation of the overall flow ways between the jackets 7 and the inner pipe or pipes, and hence insulating of the overall flow ways between the jackets 7 and inner pipe or pipes, the manhole entered ends of the longitudinally opposed sections are closed by seals 10 engaged in and blocking the adjacent ends of the flow ways. The inner pipe or pipes are extended through the seals and if desired or required, have suitable types of expansion joints 3' (bellows or sleeve types of expansion joints) interposed therein. A jumper pipe 13ª having flow control valves 15ª therein is connected to the entered ends of the casing or jacket sections, and communicates with said flow ways. Thus, the flow ways of the sections are intercommunicating, permitting the collective evacuation thereof to permit the forming of an insulating vacuum therein.

When bellows or sleeve types of expansion joints, as at 3ª (see FIGURE 4) are interposed in the lengths of a material transporting inner pipe, or pipes, the jackets 7 have expansion joint enveloping casings or jackets 7ᵇ therein, engaging over and about the same in annularly spaced relationship thereto, as shown in FIGURE 4. Thereby, the continuity of the evacuated ways between the jackets and pipes is maintained.

Similarly, as shown in FIGURE 5, flow control valve encasing or housing jackets 7ª are interposed in the piping jackets 7, being of substantially T-shaped form and inner diameter such as will engage, in spaced relation, about the control valve and its vertically disposed handle; it being noted in this connection that such a fitting is employed when the jacketed piping system is underground. Because the jackets 7ª are connected to adjacent ends of the piping jackets 7, continuity of the evacuated flow way or flow ways will be maintained. It, of course, will be understood that the upper and open ends of the control valve housing jackets 7ª are closed by appropriate covers, as indicated in dotted lines in the FIGURE 5.

The number of flowable matter transporting pipes within the casings or jackets 7 may vary. For example, plural transporting pipes of corresponding or different diameters, such as identified by the numerals 20 and 21, may be received within the casings or jackets, slidably supported in spaced and substantially parallel relation for longitudinal movement or shifting on suitably ported guide supports 9 whereby to facilitate their assembly or disassembly and to adequately compensate for expansion and/or contraction, as shown in FIGURE 8. Also, as shown in FIGURE 9, multiple matter transporting pipes of different diameters, indicated at 22 and 23, may be received coaxially within a casing 7 in telescoped and spaced relation, slidably supported as above described.

In each of these embodiments (FIGURES 8 and 9) it will be understood that continuous flow ways are provided over, about and between the jacketed pipes. When evacuated, said pipes will be afforded insulation capable of assuring the retention of matters flowing through, whether hot or cold or both, at the required temperatures. Furthermore, if desired, one or more of such pipes may be provided with enveloping sleeves formed of physical insulating material such as asbestos, fiber glass, combinations of asbestos and fiber glass, etc., as shown in dotted lines and indicated in the FIGURES 7 and 9 by the numeral 24.

The air exhausting or vacuum pipe line 13, instead of being connected to and communicating with the initiating or starting end thereof, as shown in FIGURE 2, can be arranged or installed in the manners shown in FIGURES 10, 12 and 14, especially when the casings or jackets of the utilizing piping system are sectionalized, i.e., when predetermined lengths thereof are separated (compartmented) one from the other. In illustration and referring to FIGURES 10 and 11, the casing or casing 7' are internally partitioned by positioning a plate seal, or plate seals, 25 therein. The matter transporting inner pipe 26 is passed through said plate. The air exhausting or vacuum pipe 13', housed within and travelled longitudinally of and through the casing is also passed through the partitioning plate seal which, as will be noted, is welded or otherwise fixedly and fluid-tightly connected to adjacent portions of the jacket, matter transporting inner pipe, and vacuum pipe, as at 25' thus serving not only to compartment the casing, but also to support said inner pipe and the vacuum pipe.

In order that communication may and will be effected between the vacuum pipe and the casing compartments or sectionalized internal areas, i.e., the flow ways over and about the matter transporting inner pipe, a branch pipe 27 is tapped into the vacuum pipe or line in proximity to one side of the plate seal 25 and extended through the casing wall and connected to relatively opposed elbow pipes 27' whose free ends are individually connected to and communicate with said casing compartments; valves 28 being interposed in each of the elbow pipes for selectively controlling or regulating the exhaust flow of air therefrom.

Instead of housing the air exhausting pipe 13' in the compartmented or sectionalized casing 7', it may be arranged without and longitudinally thereof, as shown in FIGURE 12. In this modified arrangement a branch pipe 29, valved at 29', is tapped into the external air exhausting pipe and one of the casing compartments. Other and similar valve branch pipes (not shown) are provided to the air exhausting pipe at spaced intervals throughout its length and communicate with the remaining or others of said compartments, thus permitting individual and/or selective evacuation thereof, as desired or required.

In jacketed piping systems wherein sections 7ª thereof are entered into manhole 5' (see FIGURE 14) said entered are closed by plate seals 30 welded or otherwise fixedly and fluid-tightly connected thereto as at 30'. The matter transporting inner pipes 26 and the casing housed air exhausting pipe 13ª are passed through the plate seals and fixedly and fluid-tightly connected thereto as by welding at 30ª. Branch pipes 31, valved as at 31', are tapped into the manhole received air exhausting pipe and the adjacent compartments whereby individual communication therewith can be selectively effected and controlled or regulated.

As to the manner of or means for closing the casing or jacket section end or ends, and so, the vacuum insulating flow way or flow ways, different forms or kinds of seals can, of course, be employed (see FIGURES 2 and 13); that is, such closures may also be made by employing plate seals 32, or as shown in the FIGURE 2, by socalled gland seals 10; air exhausting connection with the flow way or flow ways being effected by the pipe 13', valved at 15' connected to the vacuum pump 11.

From the foregoing, it will be understood and appreciated that a jacketed or encased piping system, such for example, as disclosed and taught by the hereinbefore identified patents and patent application, provided with our system of and devices for effecting insulation of its matter transporting housed piping, will be afforded beneficial results which are new and unexpected in the industry, particularly, as to the economics associate with its installation, dependability and effectiveness of insulation performance, and operational maintenance.

Single and/or multiple matter transporting pipe lines will be effectively insulated; single piping lines being insulated from the casing or jacket lines receiving them, and so, kept at the proper temperature, and multiple piping lines being insulated, one from the other, and from their casing or jacket line whereby to maintain matters flowing uni-directionally or bi-directionally therethrough will be maintained at the desired or required temperatures, whether they be hot or cold, or both.

Further, the compartmented or sectionalized casing or jacket lines, with the valved vacuum pipe line selectively communicable with their compartmented flow ways or sections, will permit any one or more thereof to be bypassed, as and when such is required; ergo, should one or more of the compartmented flow ways develop an external or internal leak, it or they can be promptly and absolutely bypassed by the vacuum pipe line without in any manner affecting its evacuating communication with the other or remaining ones. Moreover, should it be desired that certain sections of the matter transporting pipe line or lines be provided with physical insulation materials rather than being vacuum insulated, this may be done by closing the valve or valves of the vacuum pipe line normally communicating therewith (the flow way or flow ways) whereby to bypass the same, this without affecting the over-all continuity of the remaining flow ways.

The advantages and benefits of our system of insulation of jacketed piping systems, in addition to those hereinbefore stated, are multifold:

(1) Jacketed matter transporting inner pipe lines, single and multiple, will function with maximum effectiveness and satisfaction for the transporting of high and/or low temperature flowable matters and their retention at such temperatures.

(2) By jacketing or encasing the valves, expansion joints, etc., as shown in FIGURES 3, 4 and 5 of the drawings as well as their control devices, the over-all insulation of the inner pipe lines is assured in that the aforesaid evacuated flow way or flow ways will be continuous throughout the system, even when certain "blocks" or sections of the system jackets, as shown in the FIGURES 10, 12 and 14, are compartmented or sectionalized.

(3) The matter transporting inner pipe or pipes are movable within their jackets to compensate for both contraction and expansion thereof without damaging or lessening the effectiveness of the vacuum insulation. They may, if desired or required, be removed from or replaced and properly supported within the jackets without lessening the effectiveness of the vacuum insulation as would and does occur in certain types of jacketed piping systems where physical inner pipe insulation materials are employed, as for example asbestos, fiberglass, combination of asbestos and fiberglass, etc.

(4) In jacketed piping systems wherein bends of L, U, V, Z etc. form, or expansion joints or bellows, loop or sleeve types are included, the evacuated and thus insulated flow ways will be continuous and over-all effective, i.e., the entire system or selected portions ("blocks") thereof will be insulated continuously.

We claim:
1. A jacketed piping system comprising in combination a casing line and a matter transporting pipe line supported within the casing line in spaced relation to the walls thereof forming a flow way between the casing line and the matter transporting pipe line throughout their lengths, the flow way being divided into separate compartments throughout its length:
   (a) a vacuum pipe line within and disposed longitudinally of the casing line;
   (b) branch pipes extended from the vacuum pipe line at intervals throughout its length connected to and selectively communicable with adjacent compartments of said flow way;
   (c) vacuum creating means connected to the casing line communicating with said flow way; and
   (d) means positioned between the vacuum creating means and the vacuum pipe line communicating therewith and operable to maintain a vacuum of predetermined degree in and throughout the vacuum pipe line.

2. In combination with a jacketed piping system including casing lines and matter transporting pipe lines supported within the casing lines in spaced relation to the walls thereof forming flow ways between the casing and matter transporting pipe lines throughout their lengths:
   (a) a vacuum pipe line within and disposed longitudinally of the casing lines;
   (b) valved branch pipes extended from the vacuum pipe line at intervals throughout its length connected to said casing lines and selectively commmunicable with the flow ways therein and therethrough;
   (c) vacuum creating means connected to and communicating with said vacuum pipe line; and
   (d) means positioned between the vacuum creating means and the vacuum pipe line communicating therewith and operable to maintain a vacuum of predetermined degree in and throughout the vacuum pipe line.

3. In an insulated jacketed piping system the combination of:
   (a) a casing line;
   (b) a pipe line supported within the casing line in spaced relation to the walls thereof forming a flow way therebetween;
   (c) a vacuum pipe line cooperatively associated with the casing line selectively communicable with said flow way at intervals throughout its length;
   (d) vacuum creating means connected to and communicating with said vacuum pipe line; and
   (e) means positioned between the vacuum creating means and the vacuum pipe line communicating therewith and operable to maintain a vacuum of predetermined degree in and throughout said pipe line.

4. In an insulated jacketed piping system the combination of:
   (a) lengths of interconnected casing sections;
   (b) lengths of interconnected pipes supported within the casing sections in spaced relation to the walls thereof forming a flow way therebetween;
   (c) relatively spaced sealing means positioned in said flow way connected to adjacent portions of the casing sections and lengths of pipes whereby to divide the flow way into predetermined isolated lengths;
   (d) a vacuum pipe line cooperatively associated with the casing sections, selectively communicable with the isolated lengths of said flow way; and
   (e) other means positioned between the vacuum creating means and the vacuum pipe line communicating therewith and operable to maintain a vacuum of predetermined degree in and throughout said vacuum pipe line.

References Cited by the Examiner
UNITED STATES PATENTS

| | | | |
|---|---|---|---|
| 869,768 | 10/1907 | Aylsworth et al. | 137—375 |
| 1,248,467 | 12/1917 | Eby | 230—17 X |
| 1,347,194 | 7/1920 | Washington | 230—17 X |
| 1,466,592 | 8/1923 | King | 137—375 |
| 1,775,531 | 9/1930 | Kramer | 230—17 X |
| 2,478,326 | 8/1949 | Scarth | 138—148 X |
| 2,613,166 | 10/1952 | Gronemeyer | 138—148 X |
| 2,930,407 | 3/1960 | Conley et al. | 138—114 |
| 2,958,546 | 11/1960 | Lee | 138—114 X |
| 2,981,278 | 4/1961 | Bergson | 137—340 |
| 3,146,005 | 8/1964 | Peyton | 138—148 X |

FOREIGN PATENTS

| | | |
|---|---|---|
| 516,602 | 12/1920 | France. |
| 561,296 | 5/1944 | Great Britain. |

M. CARY NELSON, *Primary Examiner.*

HENRY T. KLINKSIEK, *Examiner.*